Sept. 29, 1931.  A. MEYER  1,825,239
TURBINE ROTOR DISK FASTENING MEANS
Filed March 11, 1924
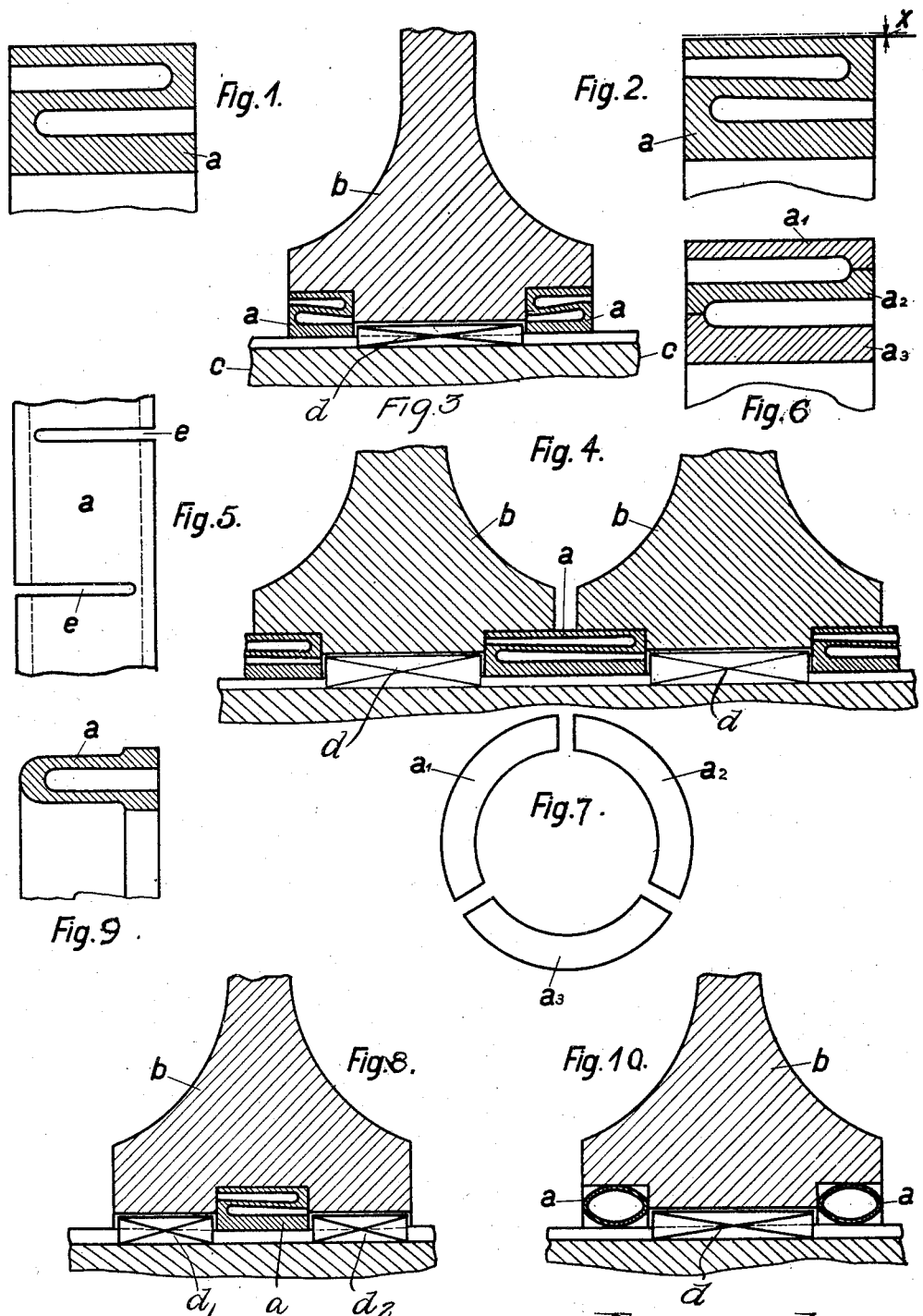

Patented Sept. 29, 1931

1,825,239

UNITED STATES PATENT OFFICE

ADOLF MEYER, OF ZURICH, SWITZERLAND, ASSIGNOR TO AKTIENGESELLSCHAFT BROWN, BOVERI AND CIE., OF BADEN, SWITZERLAND

TURBINE ROTOR DISK FASTENING MEANS

Application filed March 11, 1924, Serial No. 698,547, and in Switzerland April 11, 1923.

This invention relates to the construction of rotors for steam turbines and the like, wherein the shaft carries disks mounted thereon in encompassing relationship.

The general object of the invention is the provision of a construction whereby a secure mounting and centering of the disks on the shaft may be obtained without subjecting them to undesirably high stresses.

Another object is the provision of a construction which simplifies the accurate mounting of the disks on the shaft.

Other objects will be pointed out or indicated hereinafter, or will appear to one skilled in the art or in its employment in practice.

In the construction of high-speed turbine rotors it is customary to shrink the disks on the shaft, either directly or through the medium of rings or interposed bushes. One of the reasons for thus connecting these portions of the rotor is to avoid the loosening of the disks under the expanding effects of heat and centrifugal force, which loosening might result in dangerous or injurious mis-alignment of the parts and might be productive of dangerous or injurious vibration in operation of the machine. The shrunk-on construction, however, subjects the disks and the shaft to stresses which are undesirable, particularly in view of the heavy forces to which they are subjected by the actuating fluid and by centrifugal force when the machine is in operation. These shrinkage stresses are likely to complicate the determination of the critical speed of the machine, and with the other forces to which the parts are subjected, sometimes result in the shaft becoming bent, and in other defects in operation.

The present invention provides an arrangement whereby these various disadvantages are obviated. The invention contemplates the provision of elastic intermediate members in the nature of rings or bushes which are interposed between the shaft and the hubs of the disks, and maintained under compression, so as to exert a continuous elastic pressure upon those portions, which is effective to hold the disks centered on the shaft. In the shrinking of the disks on to these elastic centering members, the shrinkage of the disks, or the greater part thereof, is taken by the centering members by elastic deformation, so that the shaft and disks are not subjected to the heavy stresses such as are produced when the shrinkage must be accommodated by those members only. Moreover, the elastically deformed centering members follow up the disks in their expansion, such as may result from centrifugal force or heat in the operation of the machine, and at the same time retain contact with the shaft, thus continuing to exercise their centering function and to prevent vibration and mis-alignment of the disks. In order to hold the disks for rotation with the shaft, they are directly connected thereto by suitable means such as keys, which do not interfere with the action of the elastic centering members.

In the accompanying drawings forming a part of this specification, I illustrate several arrangements in which the invention may be embodied, but it is to be understood that these are presented for the purpose of illustration only and are not to be construed as exhaustive of the many forms which the invention may take. In said drawings Fig. 1 is a radial sectional view of an elastic ring such as may be employed in a construction embodying the invention, the same shown in its normal shape.

Figure 2 shows, somewhat exaggerated in the drawings, a similar section of the ring in the stressed condition, that is to say compressed by the amount $x$.

Figure 3 illustrates a radial section through part of a rotor disk mounted on a shaft with two such rings interposed.

Fig. 4 shows a similar radial section of a modified arrangement in which one elastic ring cooperates with two adjacent disks.

Fig. 5 is a developed peripheral view of a portion of a modified form of ring.

Fig. 6 is a radial section of an elastic ring built up of three superimposed members.

Fig. 7 is a side view of an elastic ring formed in three segments.

Fig. 8 is a radial section showing a portion of a disk hub and shaft with an elastic centering ring interposed between the two and keys at opposite sides of the ring.

Fig. 9 is a radial section of an elastic ring of another modified form, and

Fig. 10 is a radial section showing a hub portion of a disk and a portion of a shaft with two elastic rings of an elliptical section interposed.

In the construction according to Figure 3 the rings serve always and only for centering the rotor disk, whilst security against the turning of the rotor disk on the shaft $c$ is afforded by at least one key $d$.

The rings or bushes $a$ may, by suitable dimensioning, be rendered elastic to any desired degree so that their compression for the assemblage of the turbine necessitates a force considerably smaller than would be involved by the shrinking of the rotor disks upon rigid rings or directly upon the shaft. Even in a case in which it is desired to obtain a high compression of the rings, this invention enables the rotor disks to be mounted and removed without the tedious shrinking-on by heat treatment by simply forcing the said disks on or off the compressed rings.

Moreover, as has already been usual hitherto in the case of rigid rings, one ring $a$ may be utilized for two rotor disks $b$ as shown in Figure 4. Further, an intermediate ring of this kind may be rendered more elastic by means of a greater or lesser number of transverse slots $e$, as shown in developed view in Figure 5. It may also be composed of a plurality of pieces $a_1$, $a_2$, $a_3$ arranged for instance upon one another as shown in Figure 6 or end to end as shown in Figure 7.

The elastic intermediate member $a$ may also be arranged in the middle of the rotor disk $b$ with keys $d_1$, $d_2$ on both sides as shown in Figure 8.

Further the elasticity may be produced in other ways than by means of the Z-shape; it may be produced for instance by means of a U-shape as shown in Figure 9, or by means of tubular rings as shown in Figure 10, or the like.

The elastic intermediate members are preferably made of spring-hardened steel for the purpose of increasing the elastic limit of elongation, and ground on their jointing surfaces.

What I claim is:—

1. Turbine construction comprising the combination with a rotor shaft, of a disk mounted thereon, a resilient centering member held under elastic deformation between the shaft and disk, and means engaging the disk and shaft laterally of the centering member to hold the disk and the shaft against relative rotation.

2. Turbine construction comprising the combination of a rotor shaft, a rotor disk having a hub aperture, different portions of which are of different diameters, an elastic centering member held under compression between the disk and shaft in the aperture portion of greater diameter, and a securing member connecting the shaft and disk in the aperture portion of the lesser diameter.

3. In a turbine construction, a rotor shaft, a disk having a central aperture for mounting on said shaft, resilient rings arranged within the aperture of said disk and providing a compressible connection between said disk and said shaft, and a key within the aperture of said disk for joining said disk and said shaft against relative movement.

4. In a turbine construction, a rotor shaft, a disk having a hub portion provided with a central aperture accommodating said shaft, only a portion of said hub portion contacting with said shaft, resilient centering members arranged within the central aperture of said disk hub portion of said disk forming a compressible connection between said disk hub portion and said shaft, and a key within the aperture of said disk hub portion joining said disk and said shaft against relative movement.

In testimony whereof I have signed my name to this specification.

ADOLF MEYER.